UNITED STATES PATENT OFFICE.

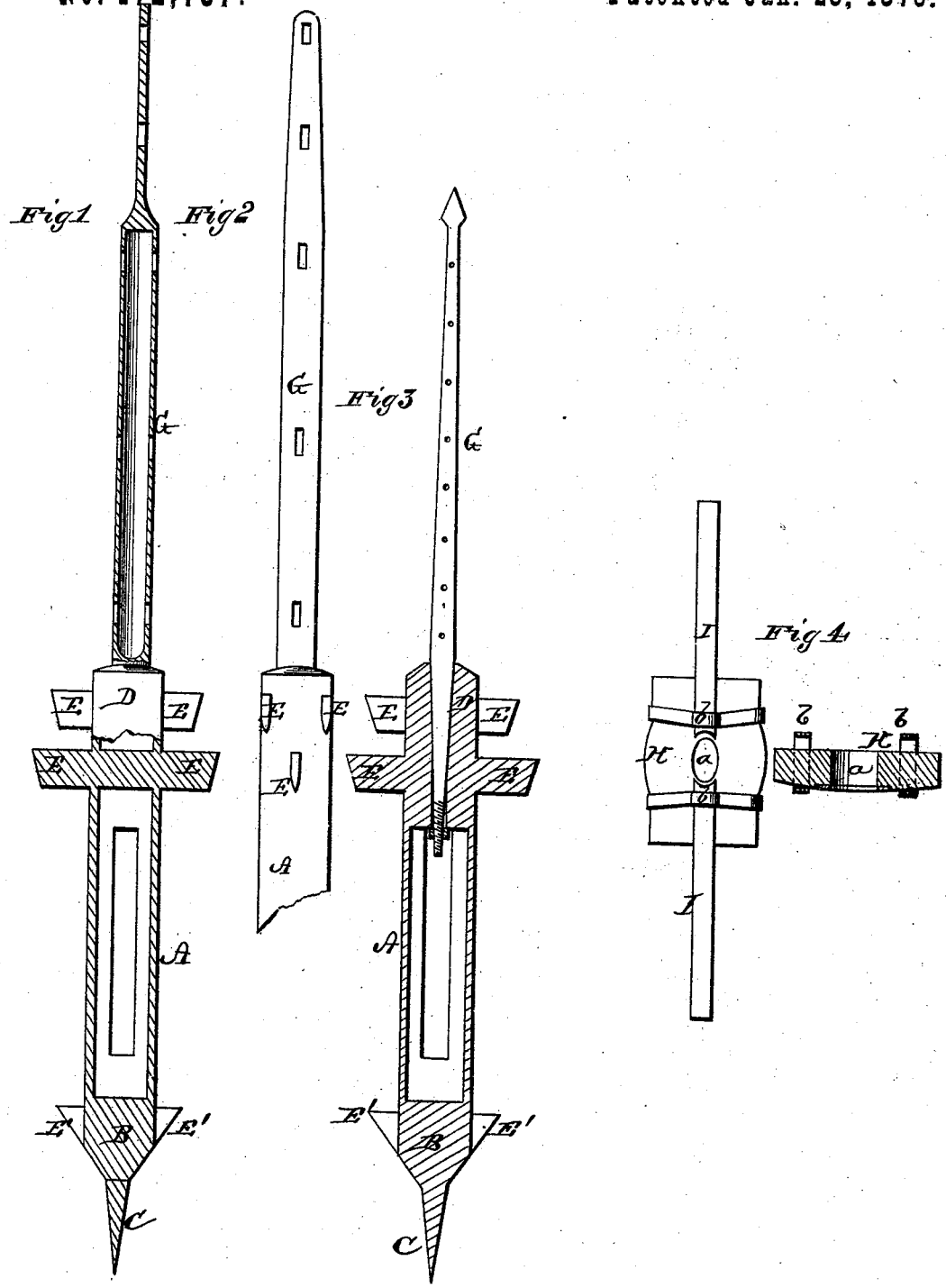
G. SHELTON.
FENCE-POST.
No. 172,787. Patented Jan. 25, 1876.

GILLUM SHELTON, OF NORMAL, ILLINOIS.

IMPROVEMENT IN FENCE-POSTS.

Specification forming part of Letters Patent No. 172,787, dated January 25, 1876; application filed November 18, 1875.

*To all whom it may concern:*

Be it known that I, GILLUM SHELTON, of Normal, in the county of McLean and in the State of Illinois, have invented certain new and useful Improvements in Iron Fence-Posts; and do hereby declare that the following is a full, clear, and exact description thereof, reference being had to the accompanying drawings, and to the letters of reference marked thereon, making a part of this specification.

The nature of my invention consists in the construction and arrangement of an iron fence-post, as will be hereinafter more fully set forth.

In order to enable others skilled in the art to which my invention appertains to make and use the same, I will now proceed to describe its construction and operation, referring to the annexed drawing, in which—

Figure 1 is a longitudinal section of my fence-post when cast all in one piece. Fig. 2 is a side view of the same. Fig. 3 is a vertical section of the post when made in two parts. Fig. 4 shows a lever or implement used in forcing the post into the ground.

A represents the part of the fence-post which is to be fastened in the ground. This part is made square and hollow, and the sides provided with longitudinal slots, as shown. The lower end B of the post A is solid, and made tapering, and it terminates in a tapering spur or point, C, which may be made round or square, as desired.

The upper end D of the post A is also made solid, and both the upper and lower ends are provided with projecting arms or flanges E and E', which run on lines parallel with the line of the fence. The upper arms E are made straight, and their lower edges beveled, as shown in Fig. 2, to form, as it were, cutting-edges on the under side.

The number of these arms may be varied; but I prefer to arrange them in the manner shown in said figure.

The lower arms E' are located in the corners of the post, and are of triangular form, the angles corresponding with the inclination of the sides of the tapering end B of the post.

The upper part G of the fence-post may be either cast with the ground part A, and the main portion thereof made hollow, as shown in Fig. 1, or said part G may be made separate of wrought-iron, and have its lower end passed through a central hole in the upper end D of the ground-post, and then fastened by means of a pin, nut, wedge-key, or other suitable means.

In setting the post in the ground, I use a block, H, having a central aperture, *a*, to fit over the part G and rest on the upper end of the ground part A of the post. On each end of the block H is a metal loop, *b*, for the insertion of a lever, I. A hole is first bored in the ground with a dirt-auger the size and depth of the square of the post, after which the bottom of the post is placed in the hole, and the block H slipped down over the part G onto the part A of the post. The levers I are then inserted in the loops *b b*, and one man is to get on the end of each lever, while a third one takes hold of the post with one hand, and with a heavy maul in the other hand taps on the block, which causes the post to go down very quick and straight.

The flanges E E' cut their way down through the solid ground, and when in hold the post firm and solid in the ground.

The top part G of the post is perforated at suitable intervals for the passage of wire to form the fence-panels.

These panels may be made of wire, band-iron, or other suitable material.

Having thus fully described my invention, what I claim as new, and desire to secure by Letters Patent, is—

1. The cast-iron ground-post A, constructed as described, with the tapering spur or point C, and projecting top and bottom arms E E', substantially as and for the purposes herein set forth.

2. The combination of the perforated top post G with the ground-post A, having a spur or point, C, and arms E E', all substantially as and for the purposes herein set forth.

In testimony that I claim the foregoing I have hereunto set my hand this 23d day of October, 1875.

GILLUM SHELTON.

Witnesses:
 THOS. SLADE,
 MCCANN DUNN.